UNITED STATES PATENT OFFICE.

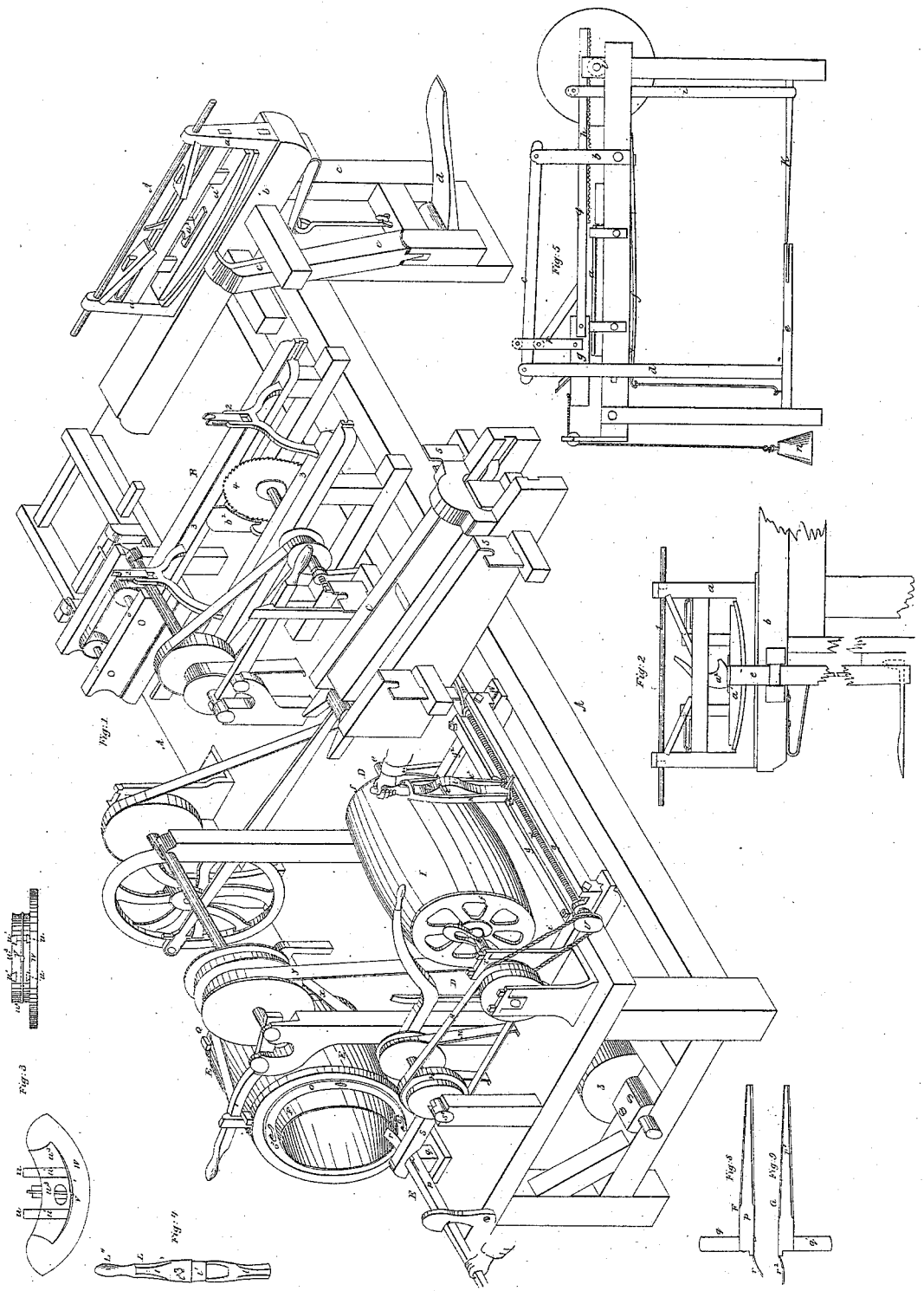

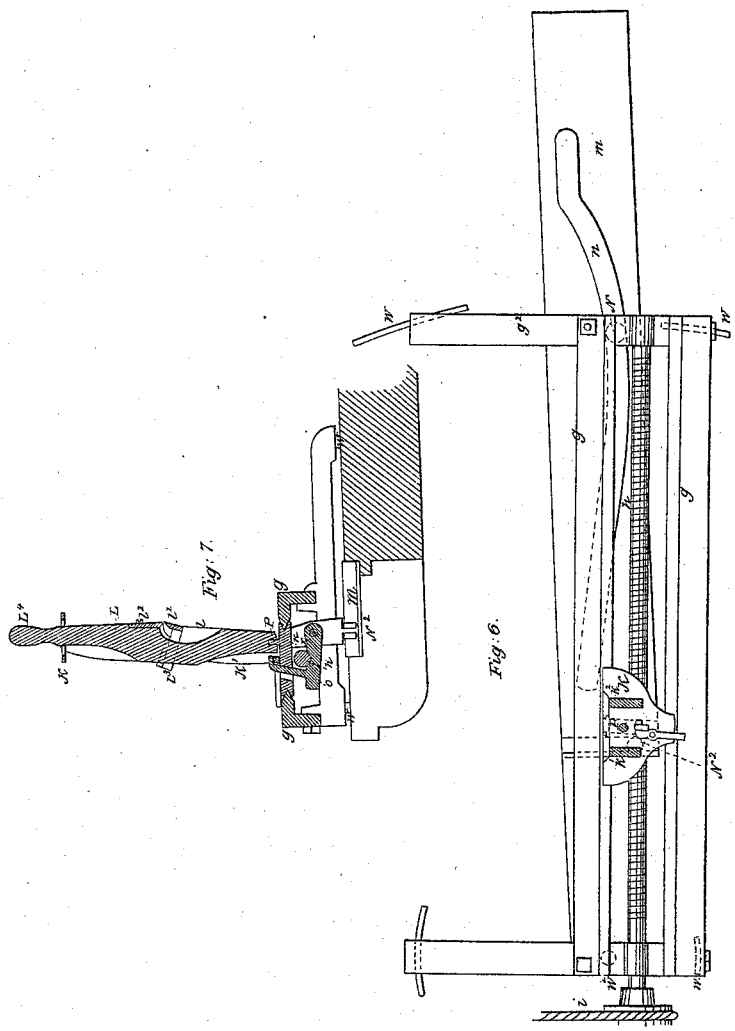

WILLIAM TRAPP, JR., OF DRYDEN, NEW YORK.

BARREL MACHINERY.

Specification forming part of Letters Patent No. 4,218, dated October 1, 1845; Reissued March 10, 1849, No. 132.

*To all whom it may concern:*

Be it known that I, WILLIAM TRAPP, Jr., of Dryden, in the county of Tompkins and State of New York, have invented a new and useful Improvement in the Construction of Machinery for the Manufacture of Firkins and other Bilge-Work; and I do hereby declare that the following is a full, clear, and exact description thereof, reference being had to the annexed drawings of the same making part of this specification, in which—

Figure 1 is an isometrical perspective view of all the machinery employed in the manufacture of the firkin, or other similar cask. Fig. 3 represents a front and edge view of the crozing tool, stock, and changeable face plate. Fig. 4 is a front or face of the tool for turning off the outside of the cask, after it is placed on the mandrel. Fig. 6 is a horizontal section of the ways, slide rest, &c., for supporting and maving the last mentioned tool in a direction to conform with the bilge of the cask. Fig. 7 is a vertical cross section of ditto. Fig. 8 is a side view of the chamfering tool, inverted. Fig. 9 is a side view of the howeling tool.

The frame A is made of sufficient capacity and strength to contain and support the several parts to be hereafter described.

After the staves have been sprung, edged, and jointed in a swing frame, or in the most approved manner, they are set up in the form of a firkin and placed between two circular metallic heads $f$ $f$ attached to a mandrel $e$, and secured to said heads by points, projecting therefrom, entering the staves. The mandrel is then placed in its bearings, as shown at D in Fig. 1, and is revolved by a band R leading from a pulley H on a shaft $S^2$ to a pulley J on the mandrel—motion being given to the shaft $S^2$ by a band M leading from a drum $z$ under the table. In front of the cask thus connected with the mandrel are arranged two parallel straight bars $g$ $g$ Figs. 1, 6 and 7, that serve as ways for a sliding rest $k$ to travel on, being firmly joined together at each end, and bolted to the frame at one end by a single bolt $W^2$, Fig. 6 on which they vibrate; and resting on ways or rails W. Between these bars is arranged a screw $h$ resting in boxes secured to the pieces connecting the extremities of the bars $g$ together, and turned by a band $i$ leading from a pulley T on the mandrel $e$ to a pulley U on the end of the screw $h$. A slide rest $k$ is placed between these bars $g$ $g$ resting on the edges of the same, which is moved past the cask over said bars, by means of a divided nut X Fig. 7 resting on the screw of the ordinary construction and arrangement so as to be detached therefrom at the will of the operator. Upon the slide rest are erected two vertical standards $k'$ $k^2$ with a cap piece K at top, having an oblong opening formed in it for the insertion of a tool and stock L between the said standards, the handle $L^4$ of said tool extending up through said opening in the cap K for the operator to lay hold of and the lower end having an opening in it, into which is inserted a pin P projecting from the upper surface of the slide rest $k$, upon which the tool rests and turns. This tool has its inner face represented at $l$, $l'$, $l^2$ Figs. 4 and 7 and is composed of a block of wood L, in which is inserted a cutter $l'$, the edge and face of which extends the full distance across the face of the stock, at right angles to the shanks $l^3$ Fig. 7, which are inclined and recessed into the sides of the stock and keyed after the manner of a plane, for holding the tool or cutter firmly in the position. Immediately above this cutter there is a gage or movable face plate $l^2$, that is kept close to the edge of the cutter $l'$ so as to form the throat of the tool, and gage the thickness of shaving to be taken off. The pin P on which the tool stock rests, holds the lower end of the stock in the required position, and allows the upper part $L^4$ to turn and move toward or from the mandrel, being guided by the slit in the cap K by this means the tool can be guided and humored to the inequalities of the cask, when it is not properly arranged in relation to the center, between the heads of the mandrel,—cutting the staves to one uniform thickness.

To move the slide rest out as it approaches the bilge of the cask I attach a pattern $m$ thereto, having a curved slit $n$ therein, into which a pin N represented by dotted lines in Fig. 6, on the under side of the right hand cross bar $g^2$ of the ways or bars $g$, enters, and as this curved pattern $m$ slides along with the rest $k$, the ends of the ways $g$ next the pattern $m$ is carried out and in, following the curve $n$, which brings the tool into proper relative position with the work, its movement corresponding with the bilge of the cask. This pin N is shown by dotted lines at N in Fig. 6. It has an antifriction roller on it for reducing the friction between the rubbing surfaces. There is a similar pin $N^2$ on the under side of the rest $k$ on which there is also an antifriction roller for traveling along in the curved slit $n$ of the pattern $m$ for guiding the tooth, as represented at $N^2$ in Fig. 7 and by dotted lines in Fig. 6.

After the cask I or firkin (as set up) has been turned off on the outside as described, it is transferred to a hollow cylinder E turning in collars Q attached to the bench, one at each end, and secured firmly therein by two chucks or annular bar wedges O made to fit the taper of the cask and inserted in the ends of the cylinder E between it and the cask I' one being fixed stationary at one end of the cylinder, and the other formed to slide in and out between the cylinder and cask. The firkin is placed in this cylinder with its ends projecting beyond it, and the circular wedge O is forced between it and the inner periphery of the cylinder, holding it firmly in its position. It is then put in motion by bands $x$, $y$, leading from the driving drum $z$ and passing around intermediate pulleys, and around the hollow cylinder. The wedge or chuck $o$, in Fig. 1 above named is divided on one side and has two staples $o^2$ driven into its end on opposite sides for drawing it out when required; by being divided it can be driven in tight, and made to bind equally on the cylinder and cask. The tools for howeling and chamfering are then applied. These tools are shown at F and G, and the one for chamfering consists of a straight bar $p$ having a foot or rest $q$ projecting from it at right angles, at one end, at which end the cutter $r$ is affixed; this tool is applied as represented at F Fig. 1. The knife being in contact with the edge of the cask and the foot $q$ resting on the bench, serving to hold the tool in a firm position during the operation; being also prevented from moving laterally by a hook $s$ fastened to a standard in the bench and brought down over the inner end. The outer end of the bar is gradually raised during the operation, causing the knife to lower and cut the chime, till said outer end of the bar comes in contact with a projection formed on a hinged gage bar $t$ attached to the frame which regulates the depth of the cut. The blade is formed of a piece of cast steel shaped so as to form a segment knife with a straight shank inserted into the handle $p$ and there secured by a staple or other proper fastening. Both edges are made sharp so as to work at both ends of the cask and are above the upper surface of the handle, as represented in Figs. 1 and 8. In Fig. 8 the tool is represented in an inverted position. In Fig. 1 it is represented in its proper position when chamfering the cask. The tool for howeling also consists of a straight bar $p^2$ Fig. 9 serving as its handle and a projection or foot $q^2$ serving as a rest or support for the tool during the operation of howeling made in a similar manner to those of the chamfering tool. The blade is also composed of a piece of cast steel forming a segment blade with two cutting edges and a straight shank to be inserted into the handle; but its cutting edges are below the upper surface of the handle as represented at $r^2$ in Fig. 9, so as to be in a proper position for performing the required operation of howeling the cask without the necessity of changing the apparatus ($s$, $t$,) for holding and gaging the tool as described.

The crozing tool V for cutting the croze is formed in the usual manner, except in the particular of constructing the stock $u^3$ so that the face plate can be changed from one side to the other so as to make the crozing tool work at either end of the cask. For this purpose the stock $u^3$ is made alike on both faces, as represented at $u^3$ Fig. 3 having dovetailed grooves $u'$ cut in it to admit corresponding dovetailed ribs $u$ formed on the face plate $w$, by which construction the crozing tool can be applied at either end of the cask by simply turning the stock on the face plate.

What I claim as my invention and desire to secure by Letters Patent is—

1. The combination of the slide rest $k$ guided in the manner set forth, with the tool L for turning off the cask, constructed and arranged in the manner set forth.

2. I also claim the apparatus for chamfering and howeling and crozing, that is to say the combination of the cylinder E open at both ends, so that both ends of the cask can be worked off without changing, with the chucks O for fastening the cask into the cylinder and with the tools as herein described for chamfering and howeling.

3. I also claim the crozing tool V with the changeable face plate $w$ as herein set forth.

4. I likewise claim the combination of the stock $l$, cutter $l'$, adjustable and gage plate $l^2$, constituting the tool for turning and smoothing the outside of the cask as above described and represented in Fig. 4.

5. I likewise claim the peculiar construction of the tool for howeling the cask as above described and represented at Fig. 9.

6. I likewise claim the peculiar construction of the tool for chamfering the ends of the cask as above described and represented in Fig. 8.

WM. TRAPP, Jr.

Witnesses:
 Wm. P. Elliott,
 Albert E. H. Johnson.